(12) United States Patent
Koike et al.

(10) Patent No.: US 11,307,670 B2
(45) Date of Patent: Apr. 19, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Ryusei Koike, Kanagawa (JP); Kae Nagano, Tokyo (JP); Koji Sato, Tokyo (JP); Koji Furusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/057,902

(22) PCT Filed: Mar. 22, 2019

(86) PCT No.: PCT/JP2019/012156
§ 371 (c)(1),
(2) Date: Nov. 23, 2020

(87) PCT Pub. No.: WO2019/230155
PCT Pub. Date: Dec. 5, 2019

(65) Prior Publication Data
US 2021/0208687 A1 Jul. 8, 2021

(30) Foreign Application Priority Data
May 31, 2018 (JP) .............................. JP2018-104642

(51) Int. Cl.
*G06F 3/01* (2006.01)
*G06F 3/16* (2006.01)
*H04N 7/14* (2006.01)

(52) U.S. Cl.
CPC ................ *G06F 3/017* (2013.01); *G06F 3/16* (2013.01); *H04N 7/147* (2013.01)

(58) Field of Classification Search
CPC ....... G06F 3/017; G06F 3/16; H04N 7/14–188; H04N 7/147
(Continued)

(56) References Cited

U.S. PATENT DOCUMENTS

2006/0149495 A1 7/2006 Mazalek et al.
2013/0300637 A1 11/2013 Smits et al.
(Continued)

FOREIGN PATENT DOCUMENTS

JP H06-245207 A 9/1994
JP 2006-041884 A 2/2006
(Continued)

OTHER PUBLICATIONS

Masaaki Fukumoto et al., "Finger-Pointer": Pointing Interface by Image Processing, Computers and Graphics, 1994, pp. 633-642, vol. 18, No. 5, Elsevier Science Ltd.

*Primary Examiner* — Hemant S Patel
(74) *Attorney, Agent, or Firm* — Paratus Law Group, PLLC

(57) ABSTRACT

An information processing apparatus, an information processing method, and a program that allow an intuitive grasp of an object indicated by a communication partner in communication through an image are provided. The information processing apparatus includes a control unit that controls interactive communication to display, on a display unit, a captured image of a space on a communication partner side acquired from the communication partner side, the control unit controlling to display an image linking a pointer used by a person on one side to an object indicated by the person.

17 Claims, 8 Drawing Sheets

(58) Field of Classification Search
USPC .......................................... 348/14.01–14.16
See application file for complete search history.

(56) References Cited

U.S. PATENT DOCUMENTS

2015/0288933 A1* 10/2015 Iversen .................. G06F 1/163
                                                                                   348/14.07
2016/0116995 A1    4/2016 Wilson et al.

FOREIGN PATENT DOCUMENTS

| JP | 2015-060579 A | 3/2015 |
| WO | WO 2015/130582 A1 | 9/2015 |
| WO | WO 2015/198729 A1 | 12/2015 |
| WO | WO 2018/074262 A1 | 4/2018 |

\* cited by examiner

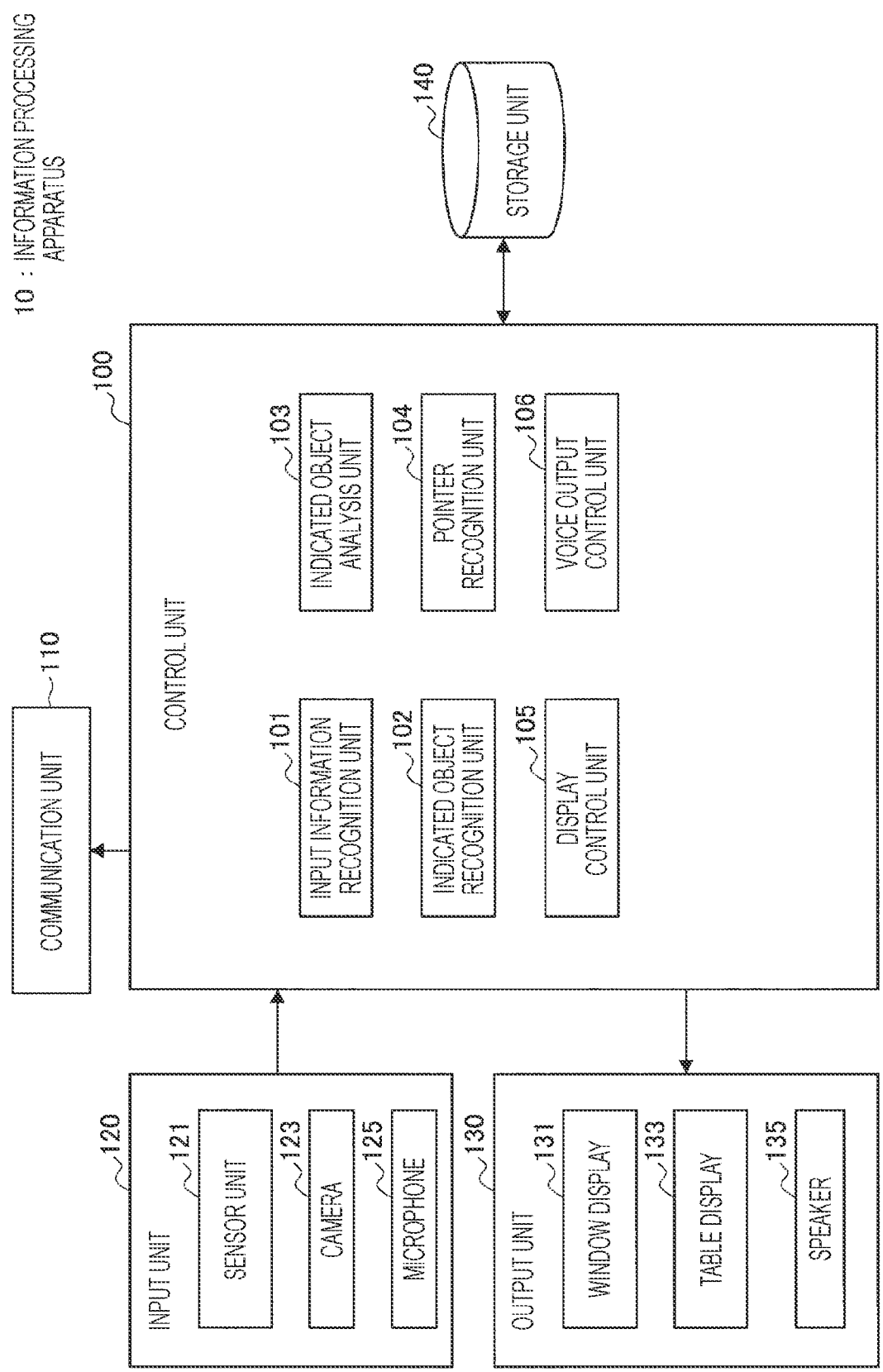

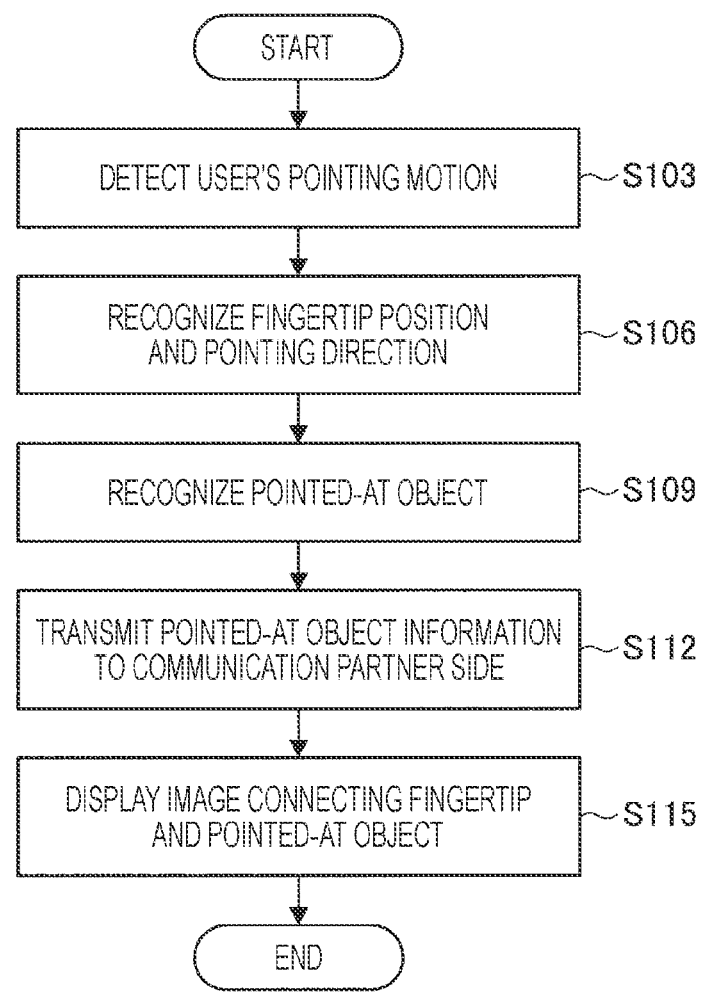

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/012156 (filed on Mar. 22, 2019) under 35 U.S.C. §371, which claims priority to Japanese Patent Application No. 2018-104642 (filed on May 31, 2018), which are all hereby incorporated by reference in their entirety.

TECHNICAL FIELD

The present disclosure relates to an information processing apparatus, an information processing method, and a program.

BACKGROUND ART

Communication systems that support communication with persons in remote locations, such as conferencing systems using videophones, have been proposed.

For example, Patent Document 1 described below discloses a technology that supports remote communication by displaying users' pointers indicating desired positions on the same content image from a plurality of remote locations.

CITATION LIST

Patent Document

Patent Document 1: Japanese Patent Application Laid-Open No. 2006-41884

SUMMARY OF THE INVENTION

Problems to be Solved by the Invention

However, objects indicated in interactive communication through an image are not limited to those in the same content image.

Thus, the present disclosure proposes an information processing apparatus, an information processing method, and a program that allow an intuitive grasp of an object indicated by a communication partner in communication through an image.

Solutions to Problems

According to the present disclosure, an information processing apparatus is proposed which includes a control unit that controls interactive communication to display, on a display unit, a captured image of a space on a communication partner side acquired from the communication partner side, the control unit controlling to display an image linking a pointer used by a person on one side to an object indicated by the person.

According to the present disclosure, an information processing method is proposed which includes controlling, by a processor, interactive communication to display, on a display unit, a captured image of a space on a communication partner side acquired from the communication partner side, and controlling, by the processor, to display an image linking a pointer used by a person on one side to an object indicated by the person.

According to the present disclosure, a program is proposed which is for causing a computer to function as a control unit that controls interactive communication to display, on a display unit, a captured image of a space on a communication partner side acquired from the communication partner side, the control unit controlling to display an image linking a pointer used by a person on one side to an object indicated by the person.

Effects of the Invention

As described above, the present disclosure allows an intuitive grasp of an object indicated by a communication partner in communication through an image.

Note that the above effects are not necessarily limiting, and any of the effects described in the present description or another effect that can be understood from the present description may be achieved together with the above effects or in place of the above effects.

BRIEF DESCRIPTION OF DRAWINGS

FIG. 3 is a block diagram showing an example of the configuration of an information processing apparatus according to the present embodiment.

FIG. 4 is a flowchart showing an example of the flow of control processing in accordance with a user's pointing motion according to the present embodiment.

MODE FOR CARRYING OUT THE INVENTION

Figure 1:
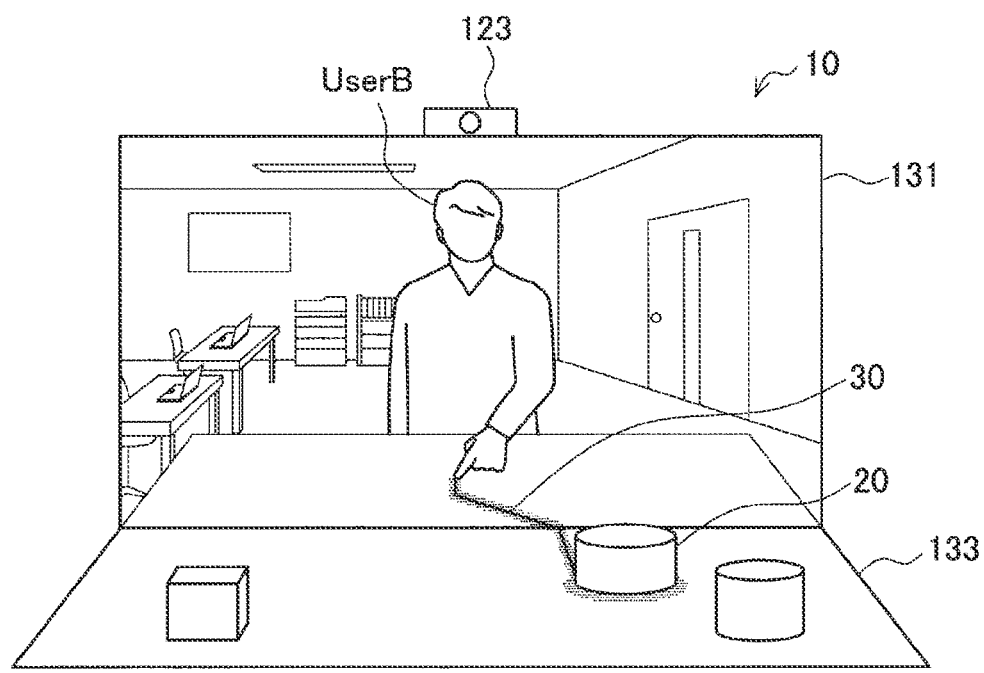
FIG. 1 is a diagram illustrating an overview of an information processing system according to an embodiment of the present disclosure.

Hereinafter, a preferred embodiment of the present disclosure will be described in detail with reference to the accompanying drawings. Note that in the present description and the drawings, the same reference numerals are assigned to components having substantially the same functional configurations to avoid duplicated explanations.

Furthermore, the description will be made in the following order.

1 Overview of information processing system according to embodiment of the present disclosure 2. Configuration example 3. Motion processing 3-1. Control processing according to user's pointing motion 3-2. Display processing according to pointing motion on communication partner side 4. Other display examples 4-1. Indication of place difficult to point at 4-2. Adjustment of indicated object area according to voice 4-3. Display control in sharing mode 5. Summary

Figure 2:
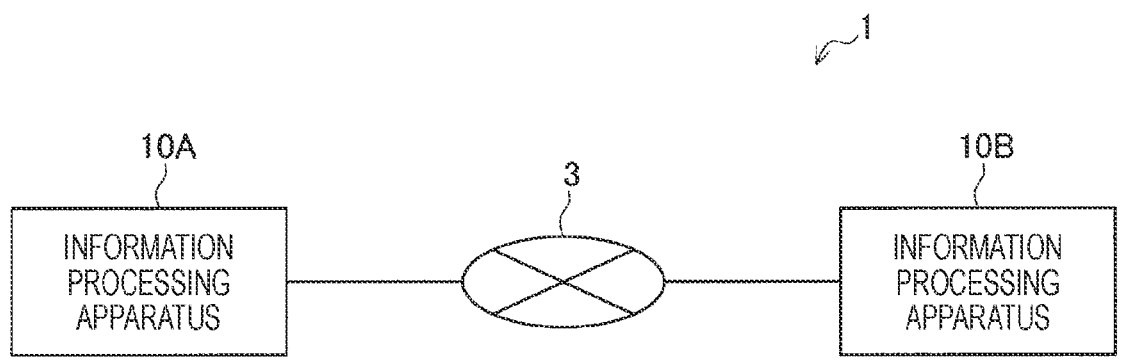
FIG. 2 is a diagram showing an example of the overall configuration of the information processing system according to the present embodiment.

1. Overview of Information Processing System According to Embodiment of the Present Disclosure FIG. 1 is a diagram illustrating an overview of an information processing system according to an embodiment of the present disclosure. The information processing system according to the present embodiment uses an information processing apparatus 10 to provide interactive communication through images and voices. As shown in FIG. 1, the information processing apparatus 10 includes a window display 131 that is a display unit, on which images of the communication partner side are displayed in real time. Such an information processing apparatus 10 is disposed in each space. For example, in a case of connecting a user A located in a space A and a user B located in a space B, as shown in FIG. 2, the information processing system 1 according to the present embodiment has a system configuration including an information processing apparatus 10A used in the space A and an information processing apparatus 10B used in the space B. The information processing apparatus 10A and the information processing apparatus 10B are connected for communication via a network 3.

When viewed from the user A side, as shown in FIG. 1, a captured image of the space B (an image showing the user B) is displayed on the window display 131 of the information processing apparatus 10, and voice information collected on the space B side is output from a speaker 135 (not shown), allowing face-to-face communication.

Furthermore, a captured image of the user A side is captured by a camera 123 and transmitted to the information processing apparatus 10B on the user B side. The disposition of the camera 123 shown in FIG. 1 is an example, and the present embodiment is not limited to this. Further, voice information on the user A side is collected by a microphone 125 (not shown) and transmitted to the information processing apparatus 10B on the user B side.

Here, in a case where pointing is performed toward a specific object in a remote location through a display screen in interactive communication through such images, a pointing direction may deviate from the object when viewed from the remote location side, depending on the camera position. For example, in the example shown in FIG. 1, the user B is pointing at a real object 20 on a table on the user A side shown on the display unit on the user B side (on which captured images captured by the camera 123 on the user A side are displayed), but the user B's pointing direction deviates from the real object 20 when viewed from the user A side, and it may be unclear where the user B is pointing at.

Therefore, the present embodiment displays an image that links a pointer used by a person on one side (for example, a human body part such as a hand or a finger, or an artificial object such as a pen or a pointing rod) to an object indicated by the person in interactive communication through images, thereby allowing an intuitive grasp of an object indicated by a communication partner.

Specifically, for example, as shown in FIG. 1, the information processing apparatus 10 performs control to display a linear image 30 connecting a fingertip of the user B shown on the window display 131 and the real object 20 placed on the table on the user A side (that is, the local side) indicated by the user B, across the window display 131 and a display unit (a table display 133) provided on the top of the table. In this way, even if a pointing direction looks different, an image connecting a pointing fingertip and an object is clearly shown, so that the user A can intuitively grasp the object indicated by the user B (here, the real object 20 on the local side).

Note that the table display 133 is used as an example in the present embodiment, but the present disclosure is not limited to this. For example, a linear image may be projected by a projector (not shown). For example, the information processing apparatus 10 projects and displays, by a projector, a linear image portion on the table, of the linear image 30 connecting the pointer (for example, a fingertip of the user B) on the window display 131 and the real object 20 on the table.

Furthermore, in the present embodiment, an "object" indicated by a user is not limited to a real object, and includes an image displayed or projected by the projector on the table display 133 (in the present description, referred to as a "virtual object"), and an area in a certain range on the table display 133 or the like.

Furthermore, FIGS. 1 and 2 illustrate communication between two points as an example, but the present embodiment is not limited to this. It is also possible to connect three or more points.

Furthermore, the arrangement and configuration of the table display 133 and the window display 131 (the combination of the display unit in a substantially horizontal direction and the display unit in a substantially vertical direction) may alternatively be provided at a desired place such as a floor, a wall, or furniture in a space (indoor or outdoor), or a notebook PC or the like.

The information processing system 1 according to the embodiment of the present disclosure has been described above. Next, the specific configuration of the information processing apparatus 10 included in the information processing system 1 according to the present embodiment will be described with reference to the drawings.

2. Configuration Example

FIG. 3 is a block diagram showing an example of the configuration of the information processing apparatus 10 according to the present embodiment. As shown in FIG. 3, the information processing apparatus 10 includes a control unit 100, a communication unit 110, an input unit 120, an output unit 130, and a storage unit 140.

2-1. Control Unit 100

The control unit 100 functions as an arithmetic processing unit and a controller, and controls all operations in the information processing apparatus 10 according to various programs. The control unit 100 is implemented, for example, by an electronic circuit such as a central processing unit (CPU) or a microprocessor. Further, the control unit 100 may include read-only memory (ROM) that stores programs to be used, operation parameters, etc., and random-access memory (RAM) that temporarily stores parameters that are properly changed, etc.

Furthermore, the control unit 100 according to the present embodiment also functions as an input information recognition unit 101, an indicated object recognition unit 102, an indicated object analysis unit 103, a pointer recognition unit 104, a display control unit 105, and a voice output control unit 106.

The input information recognition unit 101 analyzes various kinds of input information acquired from the input unit 120, and recognizes user inputs. For example, the input information recognition unit 101 analyzes an uttered voice acquired from the microphone 125, and recognizes the content of the utterance by the user (voice recognition). Furthermore, the input information recognition unit 101 recognizes a gesture (a user movement) on the basis of information acquired from a sensor unit 121 and the camera 123. Moreover, the input information recognition unit 101 can recognize a user input performed using an external device such as a remote controller (for example, an IR remote controller) or a mouse, on the basis of information acquired from the sensor unit 121 and the communication unit 110.

Regarding the recognition of a gesture (a user movement), more specifically, for example, the input information recognition unit 101 analyzes information sensed by a depth camera, a thermographic camera, an RGB camera, a touch sensor, a pressure sensor, a proximity sensor, an ultrasonic sensor, or the like, which is an example of the input unit 120. Furthermore, a "gesture (a user movement)" includes, for example, information such as the user's hand movement, pointing, arm movement, posture (for example, bone information), line of sight, or touch operation (specifically, touch, tap, double tap, swipe, or drag). For example, the input information recognition unit 101 analyzes captured images and depth information, acquires the position and depth information (in other words, three-dimensional information) of the user's hand or finger located above the display screen of the table display 133, and detects the contact or approach of the user's hand with or to the table display 133 and the withdrawal of the hand from the table display 133 in the height direction. Here, the user's bringing an operating body such as a hand into contact with or closer to the display screen is also collectively referred to simply as "contact".

The input information recognition unit 101 recognizes a touch operation on the table display 133, a pointing motion toward the window display 131, and the like as gesture information.

The indicated object recognition unit 102 recognizes an object indicated by the user when the input information recognition unit 101 recognizes an indication motion such as the user's pointing. For example, in a case where it is recognized that the user is making a pointing motion toward the window display 131, on the basis of the pointing direction (angle) with respect to the window display 131, the indicated object recognition unit 102 recognizes, from a captured image of the communication partner side displayed on the window display 131, an object that the user is pointing at (a real object, a virtual object (for example, an image displayed on the table display 133 on the communication partner side), or an area in a certain range on the communication partner side shown in the image) as an indicated object. For example, the indicated object recognition unit 102 recognizes, as an indicated object, an object displayed at a position where an extension line in the pointing direction and the captured image displayed on the window display 131 intersect. Further, the indicated object recognition unit 102 may, for example, highlight the recognized indicated object for feedback to the user. This allows the user to confirm whether or not the object that the user is pointing at is correctly recognized. If a different object is recognized, the user can, for example, change the angle of the finger for adjustment. Furthermore, the result of recognition by the indicated object recognition unit 102 is transmitted, as indicated object information, from the communication unit 110 to the information processing apparatus 10 on the communication partner side.

The indicated object analysis unit 103 analyzes an object on the user side (the local side) indicated by the communication partner, on the basis of information (indicated object information) received from the communication partner side. The indicated object information received from the communication partner side includes the result of recognition of a pointed-at-object recognized on the basis of a pointing motion by the communication partner toward a captured image of the user side displayed on the communication partner side (information such as the position and the shape of the object). On the basis of the indicated object information, the indicated object analysis unit 103 analyzes the object on the user side (the local side) that the communication partner shown on the window display 131 is pointing at through the screen (a real object placed on the table display 133, a virtual object displayed on the table display 133, an area in a certain range, or the like).

The pointer recognition unit 104 recognizes a pointer (such as a hand or a finger, for example) used by the communication partner from a captured image of the communication partner side received.

The display control unit 105 performs display control according to a user operation recognized by the input information recognition unit 101, and control to display a captured image of the communication partner side received from the communication partner side by the communication unit 110. Further, the display control unit 105 performs display control to clearly show an object indicated by the user on the basis of the result of recognition by the indicated object recognition unit 102, and performs display control to clearly show an indicated object on the local side that the communication partner is indicating through the screen, on the basis of the result of analysis by the indicated object analysis unit 103.

Specifically, the display control unit 105 performs control to display an image that links a pointer (such as a fingertip) used by a person indicating an object by a pointing motion or the like, to the indicated object (a real object, a virtual object, or a specific area). For example, the display control unit 105 displays, across the table display 133 and the window display 131, a linear image that connects a fingertip of the communication partner shown on the window display 131 and an object on the local side that the communication partner is pointing at (a real object placed on the table display 133, an image displayed on the table display 133, or the like). This allows the user to intuitively grasp the object indicated by the communication partner.

Further, according to the result of recognition by the indicated object recognition unit 102, if the user is indicating an object on the communication partner side shown on the window display 131, the display control unit 105 performs control to highlight the object in a captured image of the communication partner side shown on the window display 131. Further, according to the result of recognition by the indicated object recognition unit 102, if the user is indicating a real object placed on the table display 133 or an image (a virtual object) displayed on the table display 133, the display control unit 105 performs control to highlight the object on the table display 133.

Note that, here, the table display 133 provided on the table is used as an example of the display unit, but the present embodiment is not limited to this. Display on the table may be performed by a projector. Specifically, for example, if the communication partner is indicating a real object placed on the table through the screen, the display control unit 105 controls, using the projector, to highlight the real object and project, on the table, a linear projection image connected to a linear display image connected to a fingertip of the communication partner shown on the window display 131.

The voice output control unit 106 controls voice output from the speaker 135. For example, the voice output control unit 106 outputs voice information of the communication partner side received by the communication unit 110.

2-2. Communication Unit 110

The communication unit 110 is a connection device for connecting the information processing apparatus 10 and another device. The communication unit 110 is connected to the network 3 by, for example, wire or radio, and transmits and receives data to and from a communication destination apparatus (the information processing apparatus 10). The communication unit 110 is connected for communication to the network 3 by, for example, a wired or wireless local area network (LAN), Wi-Fi (registered trademark), Bluetooth (registered trademark), a mobile communication network (Long Term Evolution (LET)), a third-generation mobile communication system (3G)), or the like.

2-3. Input Unit 120

The input unit 120 acquires information input to the information processing apparatus 10. For example, the input unit 120 includes the sensor unit 121, the camera 123, and the microphone 125. The sensor unit 121 may include, for example, a touch sensor, a pressure sensor, a proximity sensor, an infrared light receiving unit, an ultrasonic sensor, a depth camera, a thermographic camera, an RGB camera, or the like, and may include an operation input unit formed by a physical configuration such as a button, a switch, and a lever. The camera 123 captures images of the user performing operation inputs on the table display 133 and the window display 131 (including a pointing motion). The microphone 125 senses voice information such as a voice uttered by the user.

2-4. Output Unit 130

The output unit 130 presents information output from the information processing apparatus 10 to the user. For example, the output unit 130 includes the table display 133, the window display 131, and the speaker 135. The speaker 135 outputs voice information such as a voice uttered by a partner received from a communication destination.

2-5. Storage Unit 140

The storage unit 140 is implemented by read-only memory (ROM) that stores programs, operation parameters, etc. used in the processing of the control unit 100, and random-access memory (RAM) that temporarily stores parameters that are changed properly, etc.

Further, the storage unit 140 may store the result of recognition by the input information recognition unit 101, and an image (a captured image) and a voice of the communication partner side received from the communication partner side by the communication unit 110.

The configuration of the information processing apparatus 10 according to the present embodiment has been specifically described above. Note that the configuration of the information processing apparatus 10 is not limited to the example shown in FIG. 3. For example, the information processing apparatus 10 may include a plurality of apparatuses. Furthermore, at least part of the functions of the control unit 100 of the information processing apparatus 10 may be implemented by an external device (such as a smartphone, a tablet terminal, a PC, or a server, for example).

Moreover, the information processing apparatus 10 according to the present embodiment may transmit and receive data to and from the communication partner side via a server (not shown) on the network.

3. Motion Processing

Next, motion processing of the information processing system according to the present embodiment will be specifically described with reference to the drawings.

3-1. Control Processing According to User's Pointing Motion

First, with reference to FIG. 4, control processing according to a pointing motion of the user (that is, from the local side) will be described. FIG. 4 is a flowchart showing an example of the flow of the control processing in accordance with the user's pointing motion according to the present embodiment.

As shown in FIG. 4, first, the input information recognition unit 101 of the information processing apparatus 10 analyzes an image captured by the camera 123. If it detects the user's pointing motion (step S103), it further recognizes the position of the fingertip and the pointing direction (step S106).

Next, the indicated object recognition unit 102 recognizes an object that the user is pointing at (that is, an indicated object) on the basis of the result of the recognition by the input information recognition unit 101, and an image of the communication partner side displayed on the window display 131, or the state of the table display 133 (the displayed position of a virtual object, the position of a real object placed on the table display 133, or the like) (step S109).

Next, the indicated object recognition unit 102 transmits information on the recognized pointed-at object (that is, indicated object information) from the communication unit 110 to the communication partner side (step S112).

Then, the display control unit 105 displays an image connecting the fingertip of the user and the pointed-at object (step S115). Here, display control of an indicated object according to a pointing motion from the local side will be described with reference to FIGS. 5A and 5B.

Figure 5A:
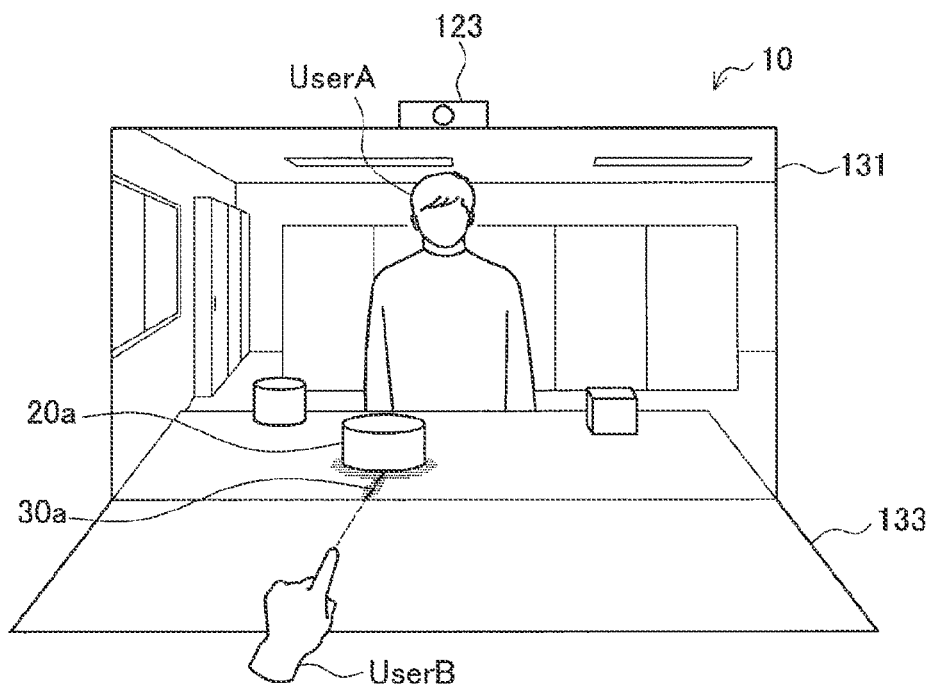
FIG. 5A is a diagram showing an example of highlighting of an indicated object in a case where pointing is performed from the local side according to the present embodiment.
Figure 5B:
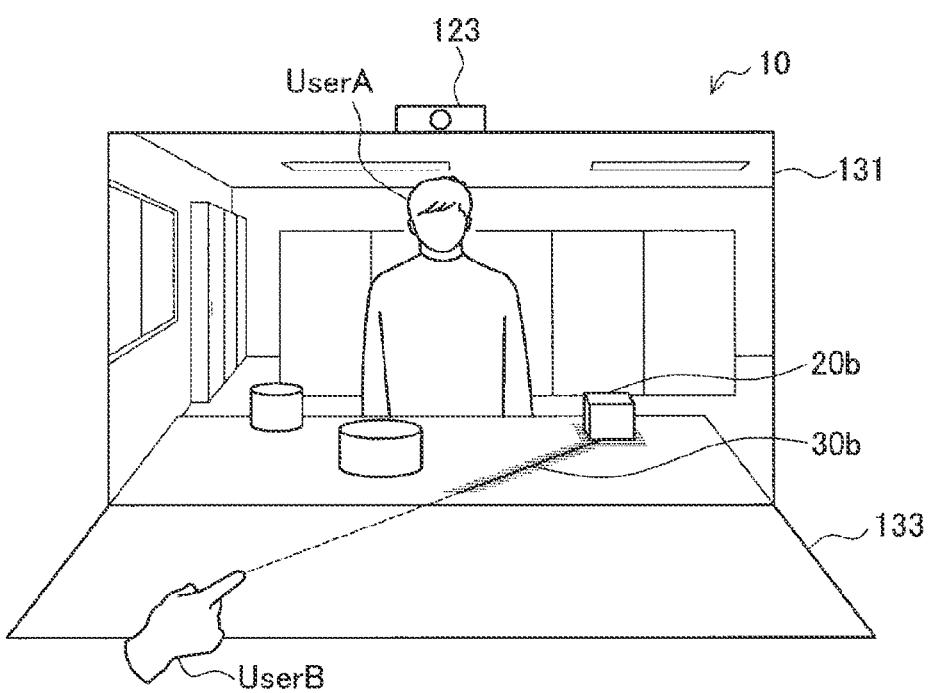
FIG. 5B is a diagram showing an example of highlighting of an indicated object in a case where pointing is performed from the local side according to the present embodiment.

FIGS. 5A and 5B are diagrams showing examples of highlighting of an indicated object in a case where a pointing motion is made from the local side according to the present embodiment. For example, as shown in FIG. 5A, in a case where the user B makes a pointing motion toward an image of the communication partner side (an image of the user A side) displayed on the table display 133, and a real object 20a placed on the table on the communication partner side is recognized as an indicated object through the screen, the display control unit 105 of the information processing apparatus 10 performs display to emphasize the real object 20a, which is the indicated object, (changes the surrounding color, blinks or the like) on the window display 131. Further, as shown in FIG. 5A, the display control unit 105 displays a linear image 30a connecting the real object 20a, which is the indicated object, and the user B's fingertip direction. This allows the user B to visually recognize that the object that the user B is pointing at is correctly recognized. Furthermore, the same applies to a case where, as shown in FIG. 5B, the user B makes a pointing motion toward an image of the communication partner side (an image of the user A side) displayed on the table display 133, and a real object 20b placed on the table on the communication partner side is recognized as an indicated object through the screen. The display control unit 105 of the information processing apparatus 10 performs display to emphasize the real object 20b, which is the indicated object, (changes the surrounding color, blinks it, or the like) on the window display 131, and further displays a linear image 30b connecting the real object 20b, which is the indicated object, and the user B's fingertip direction.

Figure 6:
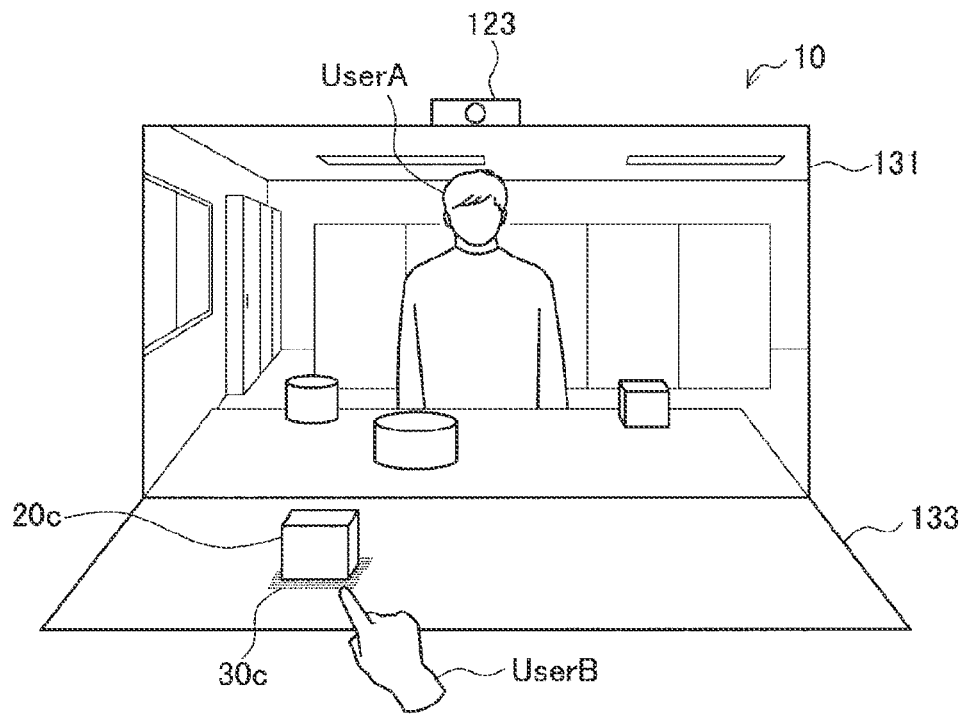
FIG. 6 is a diagram showing an example of highlighting of an indicated object in a case where a real object located on the local side is pointed at on the local side according to the present embodiment.

Note that an object indicated by the user is not limited to one beyond the screen, and may be a real object located on the local side (an object placed on the table display 133) or a virtual object (an image displayed on the table display 133). For example, as shown in FIG. 6, in a case where the user B is pointing at a real object 20c placed on the table display 133, the display control unit 105 of the information processing apparatus 10 may display an image 30c to emphasize the real object 20c, which is the indicated object, around the real object 20c on the table display 133.

Figure 7:
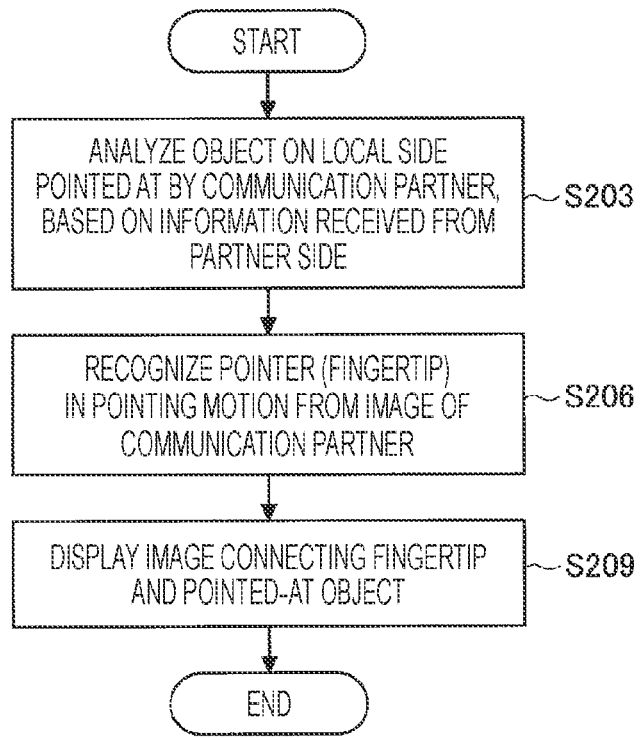
FIG. 7 is a flowchart showing an example of the flow of display processing in a case where a pointing motion is made through a screen from the communication partner side according to the present embodiment according to the present embodiment.

3-2. Display Processing According to Pointing Motion on Communication Partner Side Next, display processing in a case where a pointing motion is made from the communication partner side (the remote side) through the screen will be described with reference to FIG. 7. FIG. 7 is a flowchart showing an example of the flow of display processing in a case where a pointing motion is made from the communication partner side (the remote side) through the screen according to the present embodiment.

As show in FIG. 7, first, the indicated object analysis unit 103 of the information processing apparatus 10 analyzes an object on the local side that the communication partner shown on the window display 131 is pointing at through the screen, on the basis of information (indicated object information) received from the communication partner side (step S203).

Next, the pointer recognition unit 104 of the information processing apparatus 10 recognizes a pointer (for example, a fingertip) in the pointing motion from an image of the communication partner side displayed on the window display 131 (step S206).

Then, the display control unit 105 of the information processing apparatus 10 performs control to display an image connecting the recognized fingertip and the pointed-at object across the window display 131 and the table display 133 (step S209). An example of display according to such a pointing motion from the remote side is as shown in FIG. 1. Specifically, in a case where the user B, who is the communication partner shown on the window display 131, is pointing at the real object 20 on the local side through the screen (the window display 131), as shown in FIG. 1, the display control unit 105 of the information processing apparatus 10 performs control to display the image 30 connecting the fingertip of the user B shown on the window display 131 and the real object 20 (placed on the table display 133) on the local side, which is the indicated object, across the window display 131 and the table display 133. Consequently, even if the direction in which the partner on the remote side is pointing through the screen deviates from the object (the real object 20) on the local side when viewed from the local side, the display of the image 30 connecting the fingertip and the object allows an intuitive grasp of what the partner is pointing at.

4. Other Display Examples

As described above, in the present embodiment, an image connecting a pointer such as a fingertip of a person on the remote side and an indicated object is displayed to allow an intuitive grasp of the object indicated by the person on the remote side. Examples of display to clearly show an indicated object are not limited to the above-described example. It is also possible to properly indicate a place that is a blind spot and an area. The following specifically describes them as other display examples.

4-1. Indication of Place Difficult to Point at

Figure 8:
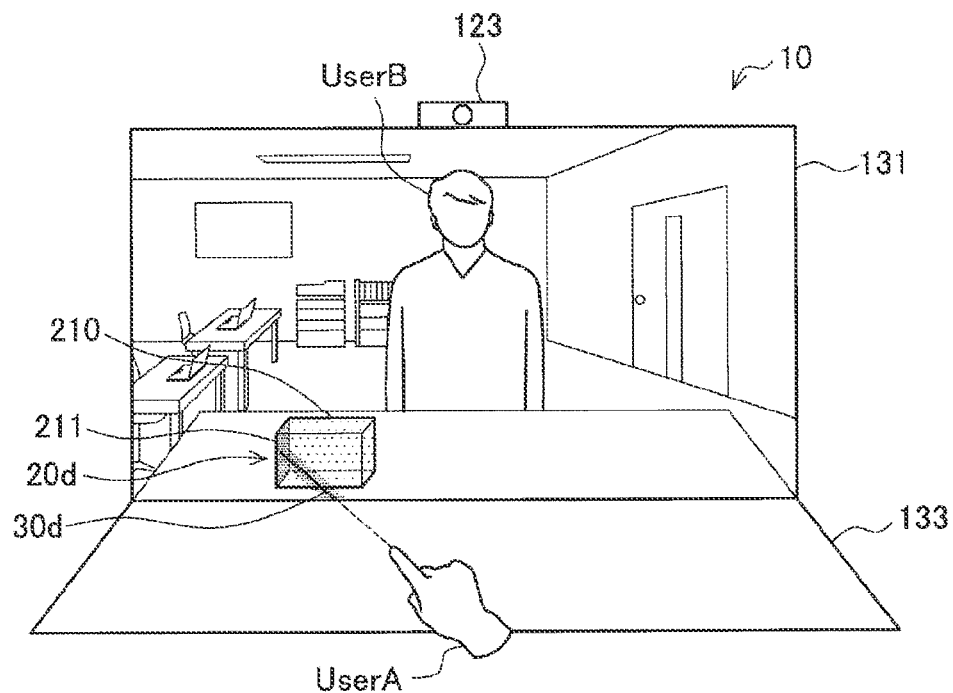
FIG. 8 is a diagram showing a display example in which the back side of a real object is indicated from the local side according to the present embodiment.

The present embodiment allows indication of a place difficult to actually point at, specifically, for example, the back side of a real object, or a plurality of objects at the same time. FIG. 8 is a diagram showing an example of display to indicate the back side of a real object 20d. from the local side according to the present embodiment. As shown in FIG. 8, for example, in a case where the user A points at the real object 20d located on the communication partner side through the screen of the window display 131, the information processing apparatus 10 superimposes an image 210 showing surfaces on the opposite side and the underside (hidden surfaces) of the real object 20d on the real object 20d for display, and highlights (for example, changes the color of or blinks) a recognized object (for example, a side surface 211 on the back side) according to the user's pointing direction. Further, the display control unit 105 of the information processing apparatus 10 displays a linear image 30d extending from the highlighted side surface 211 toward the user A's fingertip.

This allows indication of the opposite side, the underside, or the like of a real object that cannot be actually indicated. Note that the image 210 can be generated by the information processing apparatus 10 in conformance with the shape of the object. For example, the information processing apparatus 10 may extract a captured image of the back side of the object from a past image for display (if the user B has moved the real object 20d and the back side has been imaged, for example), or may show hidden lines imaginable from the appearance shape. The information processing apparatus 10 can determine whether or not to display the image 210 showing such hidden surfaces, according to a user indication (such as a specific gesture or voice).

Furthermore, an indication of the opposite side, the underside, or the like of such a real object (a real object located on the communication partner side displayed on the window display 131) is not limited to a gesture by pointing or the like. For example, an indication by voice may be used in combination. Specifically, for example, the utterance of "the back surface", "the back of this", or the like while pointing at the front surface (a visible side) of a real object (displayed on the window display 131) allows the information processing apparatus 10 to perform adjustment of the position of the indicated object. The information processing apparatus 10 highlights the position of the indicated object recognized on the basis of the gesture and the voice (for example, the side surface 211 shown in FIG. 8) for feedback to the user.

Furthermore, the highlighting of the recognized side surface 211 as shown in FIG. 8 for feedback allows the user to confirm whether or not the indicated object is correctly recognized by the system side. For example, if the user A wants to indicate the bottom. surface, not the side surface 211, the user A adjusts the pointing angle so that the bottom surface is recognized and highlighted.

Further, the information processing apparatus 10 transmits the result of the recognition of the indicated object (for example, the side surface 211 of the real object 20d being pointing at) to the communication partner side as indicated object information.

Figure 9:
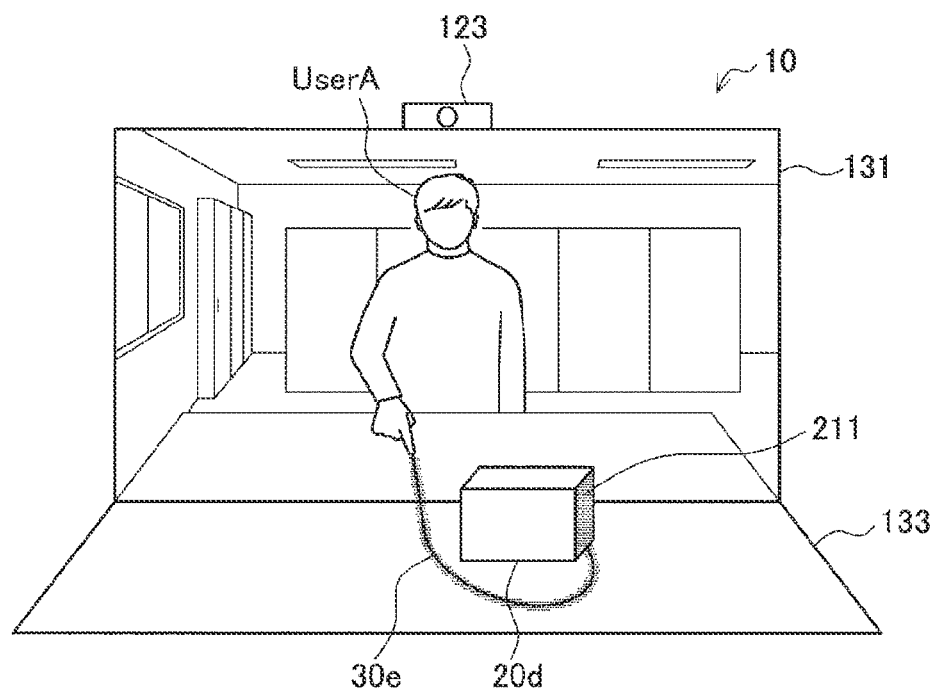
FIG. 9 is a diagram showing a display example in a case where the back side of the real object is indicated through a screen from the communication partner side (remote side) according to the present embodiment.

Next, a look from the partner side in a case where the back side of a real object is indicated from the local side through. the screen as described above will be described. with reference to FIG. 9. FIG. 9 is a diagram showing a display example in a case where the back side of the real object 20d is indicated from the communication partner side (remote side) through the screen according to the present embodiment.

In a case where the information processing apparatus 10 has analyzed that the side surface 211 of the real object 20d is being pointing at on the basis of indicated object information received from the communication partner side, as shown in FIG. 9, it performs control to display a linear image 30e connecting the fingertip of the user 4 shown on the window display 131 and the side surface 211 of the real object 20d located on the local side, across the window display 131 and the table display 133. The route of the linear image 30e is not particularly limited. For example, it may go around the real object 20d and reach the side surface 211 as shown in FIG. 9. Further, the information processing apparatus 10 may perform highlighting around the side surface 211 on the table display 133. Alternatively, if a projector is provided around, the information processing apparatus 10 may perform display to emphasize the indicated object by, for example, projecting an image on the side surface 211 of the real object 20d by the projector.

Furthermore, the present embodiment also allows pointing at a plurality of objects at once. For example, the information processing apparatus 10 can recognize a plurality of indicated objects on the basis of the user's specific gesture, voice, or the like. In this case, the information processing apparatus 10 displays, for example, a linear image connecting each of the plurality of objects and the user's fingertip. Furthermore, in a case where a plurality of objects is indicated from the remote side through the screen, the information processing apparatus 10 may display a linear image connecting each of the plurality of objects and the communication partner's fingertip shown on the window display 131, across the window display 131 and the table display 133.

4-2. Adjustment of Indicated Object Area According to Voice

The information processing apparatus 10 according to the present embodiment can adjust an indicated object area according to a voice uttered by the user. In each of the above-described embodiments, the case where a real object (the whole real object or part of the real object) is pointed at has been described as an example, but the present disclosure is not limited to this, and also allows a specific area to be indicated. Hereinafter, description will be given with reference to FIG. 10.

Figure 10:
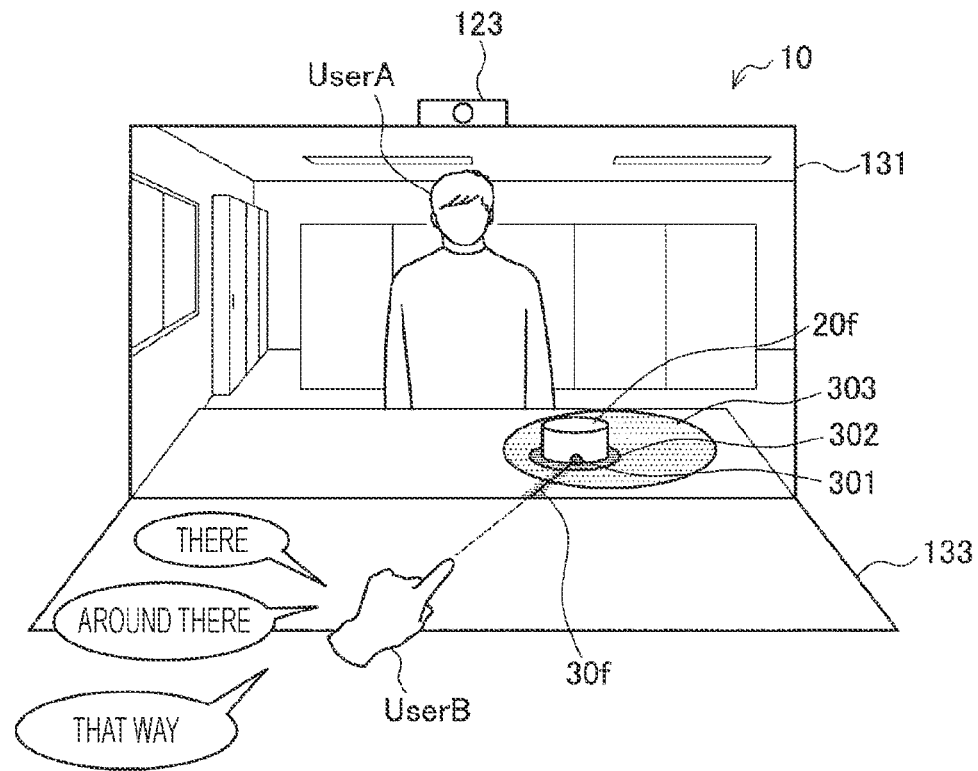
FIG. 10 is a diagram illustrating a case of indicating a specific area in conjunction with a voice through a screen according to the present embodiment.

FIG. 10 is a diagram illustrating a case where, for example, the user B indicates a specific area in conjunction with a voice through the screen. The information processing apparatus 10 recognizes an indicated object according to the recognition of a pointing gesture and an uttered voice of the user toward the window display 131, and feeds back the recognition result on the window display 131. For example, as shown in FIG. 10, in a case where the user points, uttering "there", the information processing apparatus 10 recognizes a relatively narrow point as an indicated object area, and displays an image 301 in the recognized area for feedback. Furthermore, in a case where the user points, uttering "around there", the information processing apparatus 10 recognizes an area wider than that of "there" as an indicated object area, and displays an image 302 in the recognized area for feedback. Moreover, in a case where the user points, uttering "that way", the information processing apparatus 10 recognizes an area wider than that of "around there" as an indicated object area, and displays an image 303 in the recognized area for feedback. Thus, the present embodiment allows the adjustment of the size of an indicated object area according to an indication term as an example.

Note that in the example shown in FIG. 10, part of a real object 20f located on the communication partner side or an area around it is adjusted by voice, but the present embodiment is not limited to this, and also allows the indication of a specific area on the table on the partner side, a specific area on the table (the table display 133) on the local side, or a specific area on the window display 131, regardless of the presence or absence of a real object or a virtual object.

Furthermore, the size of an indicated object area according to an indication term and indication terms can be set desirably by the user in advance.

4-3. Display Control in Sharing Mode

Figure 11:
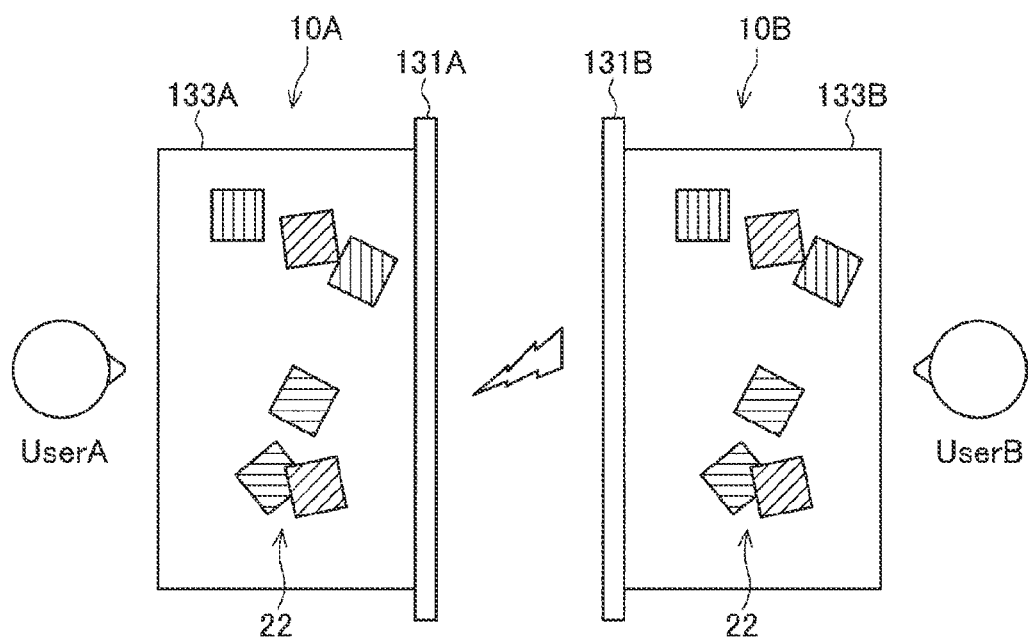
FIG. 11 is a diagram illustrating a sharing mode in which a display on table displays is shared according to the present embodiment.

Next, display control according to a pointing motion in a sharing mode in which a display on the table displays 133 of two persons connected for communication is shared will be described. In the sharing mode, for example, as shown in FIG. 11, the same image (virtual objects 22) as displayed on the table displays 133 (133A and 133B) of the two persons connected for communication (the arrangement of the virtual objects 22 may be reversed up and down or left and right). When one side controls the displayed position of a virtual object 22 or the like, the same virtual object 22 on the other side changes likewise (in real time) (the control is reflected on the other side). This allows a plurality of users in remote locations to collaborate more efficiently, using the table displays 133.

Furthermore, displaying only the communication partner on the window display 131 at an angle of view at which the table at hand (that is, the table display 133 on the communication partner side) is not shown can provide a feeling that a work is being performed as if around one table (the table display 133).

In this case, the same image (virtual objects) is displayed on each other's table display 133. Thus, if a person points at an object located on the person's desk, the person does not look to be pointing at the local object when viewed from the communication partner side. Therefore, the present embodiment performs image processing to make it clear that a local object is being pointed at, thereby providing a realistic pointing motion even in the sharing mode. Hereinafter, a specific description will be given with reference to FIG. 12.

Figure 12:
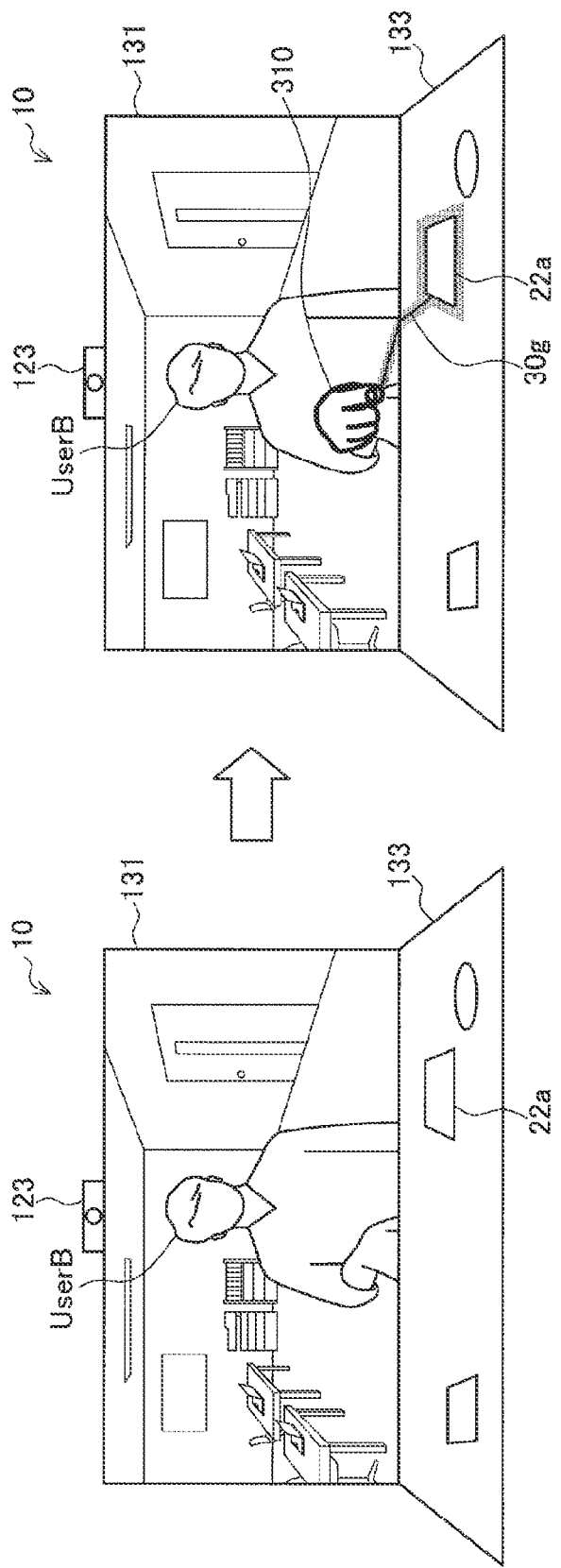
FIG. 12 is a diagram illustrating display control to clarify an indicated object in the sharing mode according to the present embodiment.

FIG. 12 is a diagram illustrating display control to clarify an indicated object in the sharing mode according to the present embodiment.

As shown on the left of FIG. 12, when the user B shown on the window display 131 is pointing at a virtual object displayed on the user B's desk (the table display 133 on the user B side), the hand is out of the angle of view and does not look to be pointing at the virtual object on the local side (the user A side). In the sharing mode, the same virtual objects are displayed on the table displays 133 of the two users. Thus, when the user B is pointing at a virtual object displayed on the user B's desk, it is preferable that the user B looks to be pointing at the same virtual object (for example, the virtual object 22a) displayed on the desk on the user A side.

Thus, as shown on the right of FIG. 12, the information processing apparatus 10 superimposes and displays a pointing image 310 since the user's fingertip (pointer) is not shown in an image on the window display 131, and displays a linear image 30g connecting the pointing image 310 and the virtual object 22a, which is the indicated object, across the window display 131 and the table display 133. Information on the indicated object can be determined on the basis of indicated object information received from the communication partner side.

This allows an intuitive grasp of what the user on the remote side (the communication partner side) is pointing at even in a case where the hand and the place under it are not displayed in the sharing mode.

5. Summary

As described above, the information processing system according to the embodiment of the present disclosure allows an intuitive grasp of an object indicated by a communication partner in communication through an image.

Furthermore, in a case where a plurality of people is individually pointing from one side through a screen, an image connecting the fingertip of each user and a corresponding indicated object may be displayed likewise.

Although the preferred embodiment of the present disclosure has been described in detail above with reference to the accompanying drawings, the present technology is not limited to the examples. It is obvious that a person having ordinary knowledge in the technical field of the present disclosure can arrive at various alterations or modifications within the scope of the technical idea described in the claims. These are, of course, considered to belong to the technical scope of the present disclosure.

For example, it is possible to create a computer program for causing hardware such as a CPU, ROM, and RAM built in the above-described information processing apparatus 10 to deliver the functions of the information processing apparatus 10. Furthermore, a computer-readable storage medium in which the computer program is stored is provided.

Moreover, the effects described in the present description are merely illustrative or exemplary and are not limiting. That is, the technology according to the present disclosure can achieve other effects that are obvious to those skilled in the art from the description of the present description in addition to the above effects or in place of the above effects.

Note that the present technology can also have the following configurations.

(1)

An information processing apparatus including a control unit that controls interactive communication to display, on a display unit, a captured image of a space on a communication partner side acquired from the communication partner side, the control unit controlling to display an image linking a pointer used by a person on one side to an object indicated by the person.

(2)

The information processing apparatus according to (1) above, in which the control unit displays a linear image connecting the pointer and the object as the linking image.

(3)

The information processing apparatus according to (1) or (2) above, in which the pointer is a finger of the person.

(4)

The information processing apparatus according to any one of (1) to (3) above, in which the control unit displays a linear image connecting a fingertip pointed by a communication partner shown on the display unit displaying the captured image, and the object indicated by the communication partner.

(5)

The information processing apparatus according to any one of (1) to (4) above, in which the object is a real object, and the control unit performs control to display a linear image connecting the pointer and the real object across a second display unit on which the real object is placed and a first display unit on which the captured image is displayed.

(6)

The information processing apparatus according to any one of (1) to (4) above, in which the object is a real object, and the control unit performs control to project, by a projector, a linear projection. image connecting a place on which the real object is placed, connected to a linear display image connecting the pointer and the object on the display unit on which the captured image is displayed.

(7)

The information processing apparatus according to any one of (1) to (4) above, in which the object is a virtual object, and the control unit performs control to display a linear image connecting the pointer and the virtual object across a second display unit on which the virtual object is displayed and a first display unit on which the captured image is displayed.

(8)

The information processing apparatus according to any one of (1) to (7) above, in which the control unit identifies an object located on a local side indicated by a communication partner shown on the display unit, on the basis of indicated object information received from the communication partner side.

(9)

The information processing apparatus according to any one of (1) to (8) above, in which the control unit identifies an object located on a local side indicated by a communication partner shown on the display unit, on the basis of indicated object information received from the communication partner side, and the control unit performs control, when the pointer is not shown on the display unit, to superimpose and display a virtual image of the pointer, and display a linear image connecting the pointer of the virtual image and the identified object.

(10)

The information processing apparatus according to any one of (1) to (9) above, in which the control unit superimposes, on an object on the communication partner side shown on the display unit, a virtual image showing hidden surfaces of the object for display, and the control unit identifies a surface indicated by a user on the basis of the user's indication motion toward the virtual image.

(11)

The information processing apparatus according to any one of (1) to (10) above, in which the control unit identifies a surface of an object located on a local side indicated by a communication partner shown on the display unit, on the basis of indicated object information received from the communication partner side, and the control unit displays a linear image connecting the pointer used by the communication partner shown on the display unit and the identified surface of the object.

(12)

The information processing apparatus according to any one of (1) to (11) above, in which the control unit identifies an object indicated by a user on the basis of the user's indication motion.

(13)

The information processing apparatus according to (12) above, in which the display unit performs display to clearly show the identified object.

(14)

The information processing apparatus according to (12) or (13) above, in which the display unit further identifies an object area indicated by the user on the basis of the user's voice.

(15)

An information processing method including:

controlling, by a processor, interactive communication to display, on a display unit, a captured image of a space on a communication partner side acquired from the communication partner side; and controlling, by the processor, to display an image linking a pointer used by a person on one side to an object indicated by the person.

(16)

A program for causing a computer to function as a control unit that controls interactive communication to display, on a display unit, a captured image of a space on a communication partner side acquired from the communication partner side, the control unit controlling to display an image linking a pointer used by a person on one side to an object indicated by the person.

REFERENCE SIGNS LIST

1 Information processing system
3 Network
10 Information. processing apparatus
20 Real object
22 Virtual object
100 Control unit
101 Input information recognition unit
102 Indicated object recognition unit
103 Indicated object analysis unit
104 Pointer recognition unit
105 Display control unit
106 Voice output control unit
110 Communication unit
120 Input unit
121 Sensor unit
123 Camera
125 Microphone
130 Output unit
131 Window display
133 Table display
135 Speaker
140 Storage unit

The invention claimed is:

1. An information processing apparatus comprising
a control unit configured to
control interactive communication to display, on a display unit, a captured image of a space on a communication partner side acquired from the communication partner side, and
control to display a pointer used by a person on one side to an object indicated by the person and a linking image linking the pointer to the object, the linking image being different than the pointer,
wherein the control unit and the display unit are each implemented via at least one processor.

2. The information processing apparatus according to claim 1, wherein
the linking image is a linear image connecting the pointer and the object.

3. The information processing apparatus according to claim 1, wherein
the pointer is a finger of the person.

4. The information processing apparatus according to claim 1, wherein
the linking image is a linear image connecting a fingertip pointed by a communication partner shown on the display unit displaying the captured image, and the object indicated by the communication partner.

5. The information processing apparatus according to claim 1, wherein
the object is a real object, and
the linking image is a linear image connecting the pointer and the real object across a second display unit on which the real object is placed and a first display unit on which the captured image is displayed.

6. The information processing apparatus according to claim 1, wherein
the object is a real object, and
the control unit is further configured to perform control to project, by a projector, a linear projection image connecting a place on which the real object is placed to a linear display image connecting the pointer and the object on the display unit on which the captured image is displayed.

7. The information processing apparatus according to claim 1, further comprising
a first display unit, and
a second display unit, wherein
the object is a virtual object,
the linking image is a linear image connecting the pointer and the virtual object across the second display unit on which the virtual object is displayed and the first display unit on which the captured image is displayed,
wherein the first display unit and the second display unit are each implemented via at least one processor.

8. The information processing apparatus according to claim 1, wherein
the control unit is further configured to identify an object located on a local side indicated by a communication partner shown on the display unit, on a basis of indicated object information received from the communication partner side.

9. The information processing apparatus according to claim 1, wherein
the control unit is further configured to identify an object located on a local side indicated by a communication partner shown on the display unit, on a basis of indicated object information received from the communication partner side, and
perform control, when the pointer is not shown on the display unit, to superimpose and display a virtual image of the pointer, and display a linear image connecting the pointer of the virtual image and the identified object.

10. The information processing apparatus according to claim 1, wherein
the control unit is further configured to superimpose, on an object on the communication partner side shown on the display unit, a virtual image showing hidden surfaces of the object for display, and
identify a surface indicated by a user on a basis of the user's indication motion toward the virtual image.

11. The information processing apparatus according to claim 1, wherein
the control unit is further configured to identify a surface of an object located on a local side indicated by a communication partner shown on the display unit, on a basis of indicated object information received from the communication partner side, and
the linking image is a linear image connecting the pointer used by the communication partner shown on the display unit and the identified surface of the object.

12. The information processing apparatus according to claim 1, wherein
the control unit is further configured to identify an object indicated by a user on a basis of the user's indication motion.

13. The information processing apparatus according to claim 12, wherein
the display unit is further configured to perform display to clearly show the identified object.

14. The information processing apparatus according to claim 12, wherein
the display unit is further configured to identify an object area indicated by the user on a basis of the user's voice.

15. The information processing apparatus according to claim 1, wherein only a first portion of the linking image is displayed on a second display unit on which the object is placed and only a second portion of the linking image is displayed on a first display unit on which the captured image is displayed, the first portion being different than the second portion, and
wherein the first display unit and the second display unit are each implemented via at least one processor.

16. An information processing method comprising:
controlling, by a processor, interactive communication to display, on a display, a captured image of a space on a communication partner side acquired from the communication partner side; and
controlling, by the processor, to display a pointer used by a person on one side to an object indicated by the person and a linking image linking the pointer to the object, the linking image being different than the pointer.

17. A non-transitory computer-readable medium having embodied thereon a program, which when executed by a computer causes the computer to execute an information processing method, the method comprising:
controlling interactive communication to display, on a display, a captured image of a space on a communication partner side acquired from the communication partner side; and
controlling to display a pointer used by a person on one side to an object indicated by the person and a linking image linking the pointer to the object, the linking image being different than the pointer.

* * * * *